US012615519B2

(12) United States Patent
Jain et al.

(10) Patent No.:  US 12,615,519 B2
(45) Date of Patent:  Apr. 28, 2026

(54) SYSTEM AND METHOD FOR SERVICE GAP IDENTIFICATION

(71) Applicant: Rakuten Symphony, Inc., Tokyo (JP)

(72) Inventors: Amber Jain, Indore (IN); Atul Rajpoot, Indore (IN); Durgesh Rathore, Indore (IN); Nilesh Bankar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 660 days.

(21) Appl. No.: 17/910,995

(22) PCT Filed: Jun. 10, 2022

(86) PCT No.: PCT/US2022/032939
§ 371 (c)(1),
(2) Date: Sep. 12, 2022

(87) PCT Pub. No.: WO2023/239366
PCT Pub. Date: Dec. 14, 2023

(65) Prior Publication Data
US 2024/0298189 A1     Sep. 5, 2024

(51) Int. Cl.
*H04W 16/18*        (2009.01)
*H04W 16/30*        (2009.01)
*H04W 64/00*        (2009.01)
(52) U.S. Cl.
CPC ........... *H04W 16/18* (2013.01); *H04W 16/30* (2013.01); *H04W 64/003* (2013.01)

(58) Field of Classification Search
CPC ... H04W 16/18; H04W 16/30; H04W 64/003; H04W 24/08
See application file for complete search history.

(56) References Cited

U.S. PATENT DOCUMENTS

| | | | | |
|---|---|---|---|---|
| 6,266,514 B1 * | 7/2001 | O'Donnell | ............ | H04W 24/02 455/67.7 |
| 8,639,212 B1 * | 1/2014 | Sennett | ................. | H04W 16/26 455/457 |
| 2005/0054339 A1 * | 3/2005 | Merritt | .................. | H04W 24/02 455/67.11 |

(Continued)

FOREIGN PATENT DOCUMENTS

CN          110602741 A  * 12/2019   ............ H04W 24/10

OTHER PUBLICATIONS

International Search Report of PCT/US2022/032939 dated Aug. 25, 2022 [PCT/ISA/210].

(Continued)

*Primary Examiner* — Yuwen Pan
*Assistant Examiner* — Swati Jain
(74) *Attorney, Agent, or Firm* — Sughrue Mion, PLLC

(57)          ABSTRACT
A system and a method for service gap identification is disclosed. The method comprises retrieving data on a network coverage area, dividing the network coverage area into a plurality of data sets, determining a first number of data sets of the plurality of data sets having a first number of poor coverage samples based on the retrieved data, and generating a service gap polygon based on the determined number of data sets having the first number of poor coverage samples.

14 Claims, 8 Drawing Sheets

702 — Retrieve data on a network coverage area.

704 — Divide the network coverage area into a plurality of data sets.

706 — Determine a first number of data sets of the plurality of data sets having a first number of poor coverage samples based on the retrieved data.

708 — Generate a service gap polygon based on the determined number of data sets having the first number of poor coverage samples.

(56) References Cited

U.S. PATENT DOCUMENTS

| | | | | |
|---|---|---|---|---|
| 2010/0211597 A1* | 8/2010 | Huoviala | ............ | H04L 12/5692 |
| | | | | 707/769 |
| 2011/0131317 A1* | 6/2011 | Sanders | ................ | H04W 24/00 |
| | | | | 709/224 |
| 2014/0171082 A1* | 6/2014 | Smadi | ................. | H04W 36/302 |
| | | | | 455/436 |
| 2016/0219482 A1* | 7/2016 | Smith | ................... | H04W 36/30 |
| 2017/0055200 A1* | 2/2017 | Hassan | ................. | H04W 48/08 |
| 2020/0396019 A1* | 12/2020 | Lumbatis | ............ | H04W 64/006 |
| 2022/0329524 A1* | 10/2022 | Sinha | ................... | H04L 41/0896 |
| 2024/0098509 A1* | 3/2024 | Indrieri | ................. | H04W 16/18 |

OTHER PUBLICATIONS

Written Opinion of PCT/US2022/032939 dated Aug. 25, 2022 [PCT/ISA/237].

* cited by examiner

100

110    User Device

130    Network

120    Server Device

| | | | | | | | | | |
|---|---|---|---|---|---|---|---|---|---|
| 501 | 511 | | 515 | | | | 519 | | |
| 502 | | 512 | | 514 | | | | 518 | 520 |
| 503 | | | 513 | | | | | | |
| 504 | | | | | | | 517 | | 508 |
| 505 | | | | | | 516 | 506 | | 507 |

550    552

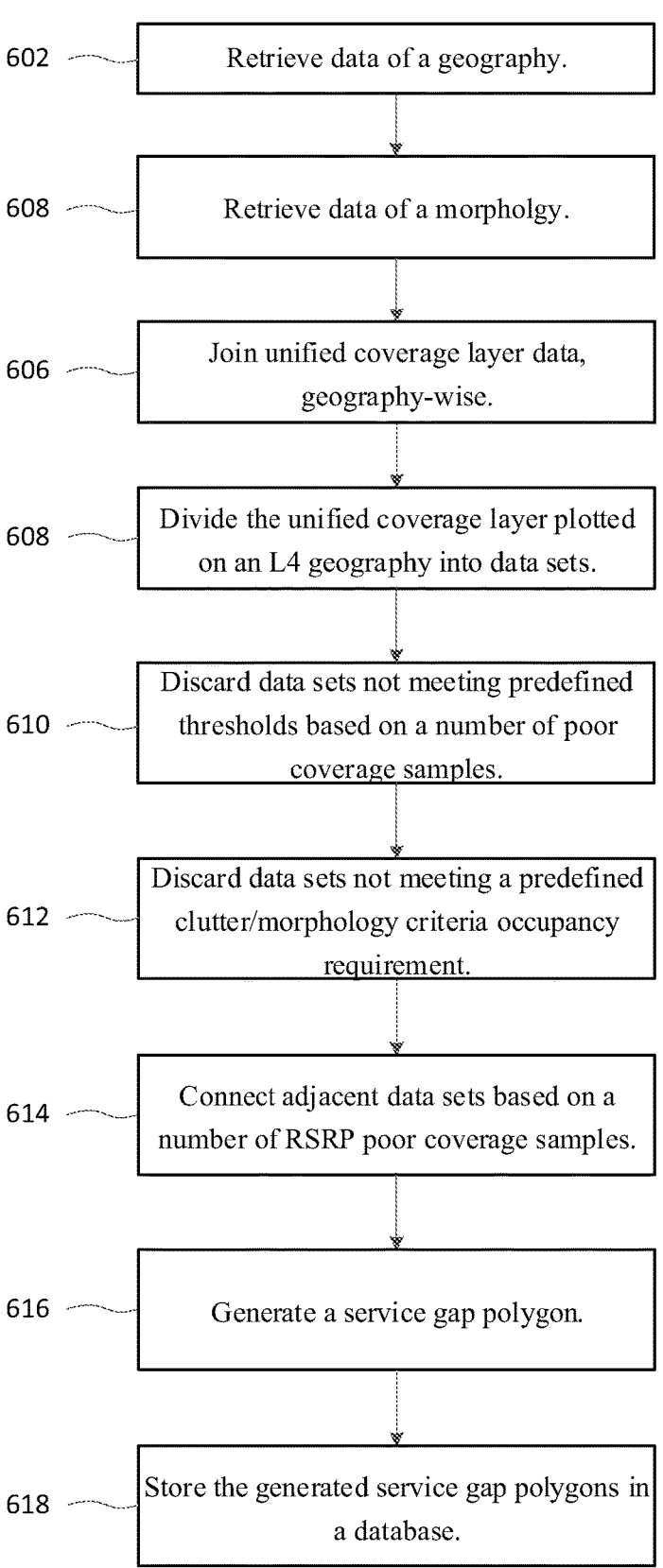

602 — Retrieve data of a geography.

608 — Retrieve data of a morpholgy.

606 — Join unified coverage layer data, geography-wise.

608 — Divide the unified coverage layer plotted on an L4 geography into data sets.

610 — Discard data sets not meeting predefined thresholds based on a number of poor coverage samples.

612 — Discard data sets not meeting a predefined clutter/morphology criteria occupancy requirement.

614 — Connect adjacent data sets based on a number of RSRP poor coverage samples.

616 — Generate a service gap polygon.

618 — Store the generated service gap polygons in a database.

FIG. 6

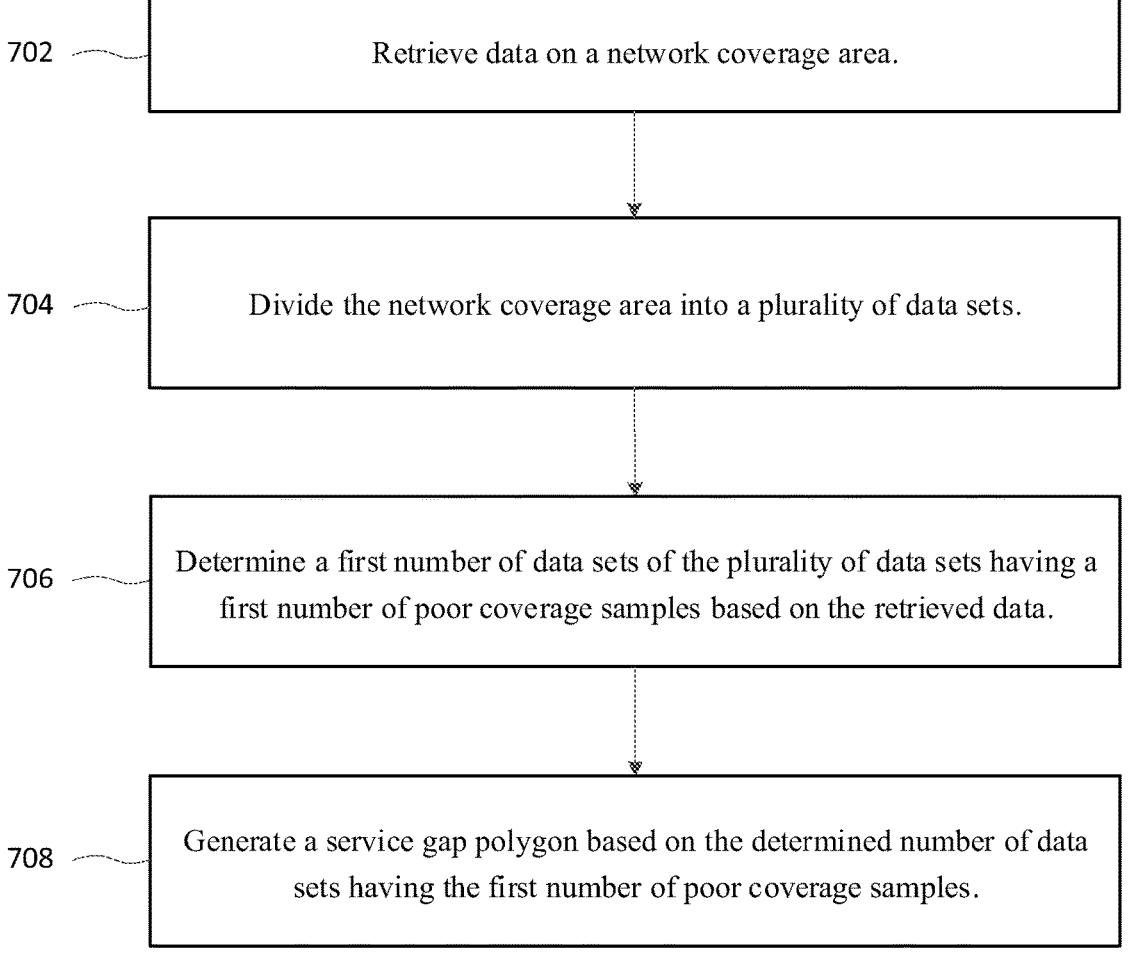

702   Retrieve data on a network coverage area.

704   Divide the network coverage area into a plurality of data sets.

706   Determine a first number of data sets of the plurality of data sets having a first number of poor coverage samples based on the retrieved data.

708   Generate a service gap polygon based on the determined number of data sets having the first number of poor coverage samples.

FIG. 7

SYSTEM AND METHOD FOR SERVICE GAP IDENTIFICATION

CROSS REFERENCE TO RELATED APPLICATIONS

This application is a National Stage of International Application No. PCT/US2022/032939 filed on Jun. 10, 2022.

1. FIELD

The disclosure is related generally to service gap identification in network coverage.

2. DESCRIPTION OF RELATED ART

A network area may include service gaps that have poor network coverage or no network coverage. Service gaps downgrade the overall quality and performance of the network, and are a cause of dissatisfaction for network users or customers of a telecommunications operator. Thus, identifying service gaps in an effective manner is important in order to eliminate or mitigate them in the network. There exists a need for improved processes for identifying service gaps.

SUMMARY

According to an aspect of an example embodiment, a method for service gap identification may include retrieving data on a network coverage area, dividing the network coverage area into a plurality of data sets, determining a first number of data sets of the plurality of data sets having a first number of poor coverage samples based on the retrieved data, and generating a service gap polygon based on the determined number of data sets having the first number of poor coverage samples.

According to an aspect of an example embodiment, a system for service gap identification may include a memory storing instructions and a processor configured to execute the instructions to retrieve data on a network coverage area, divide the network coverage area into a plurality of data sets, determine a first number of data sets of the plurality of data sets having a first number of poor coverage samples based on the retrieved data, and generate a service gap polygon based on the determined number of data sets having the first number of poor coverage samples.

According to an aspect of an example embodiment, a non-transitory computer-readable storage medium may store instructions that, when executed by at least one processor, cause the at least one processor to retrieve data on a network coverage area, divide the network coverage area into a plurality of data sets, determine a first number of data sets of the plurality of data sets having a first number of poor coverage samples based on the retrieved data, and generate a service gap polygon based on the determined number of data sets having the first number of poor coverage samples.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 5 is a diagram of a network cluster, according to an example embodiment;

FIG. 6 is a flowchart of a method of identifying a service gap, according to an embodiment; and FIG. 7 is a flowchart of a method of generating a service gap polygon, according to an example embodiment.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
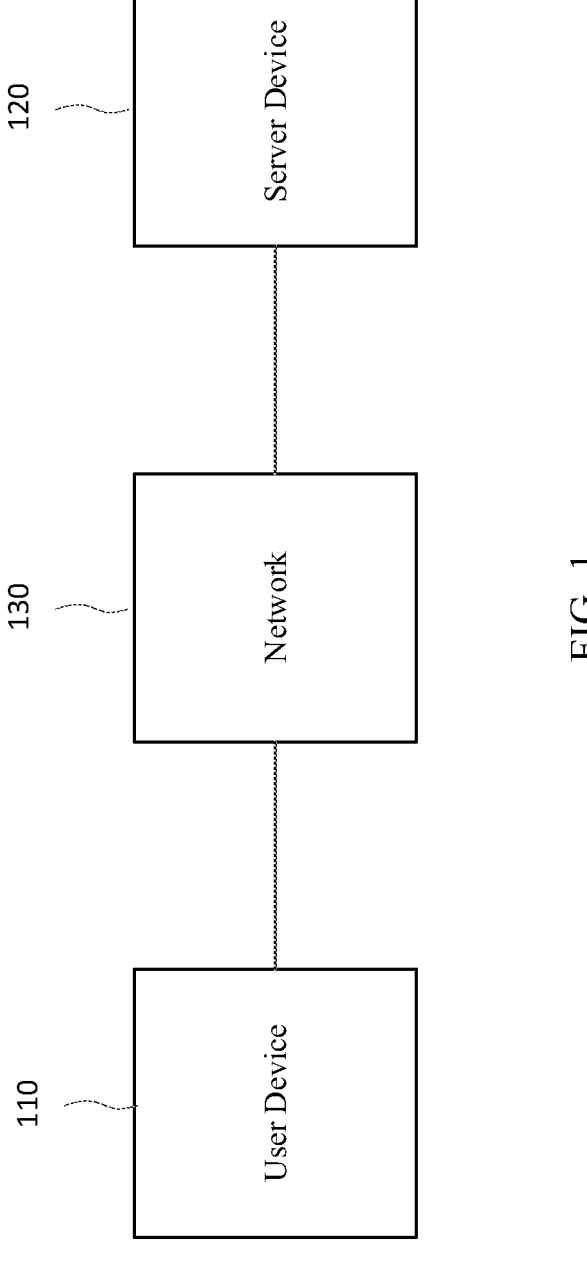
FIG. 1 is a diagram of a system according to an embodiment.

FIG. 1 is a diagram of a system 100 according to an embodiment. FIG. 1 includes a user device 110, a server device 120, and a network 130. The user device 110 and the server device 120 may interconnect via through the network 130 providing wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
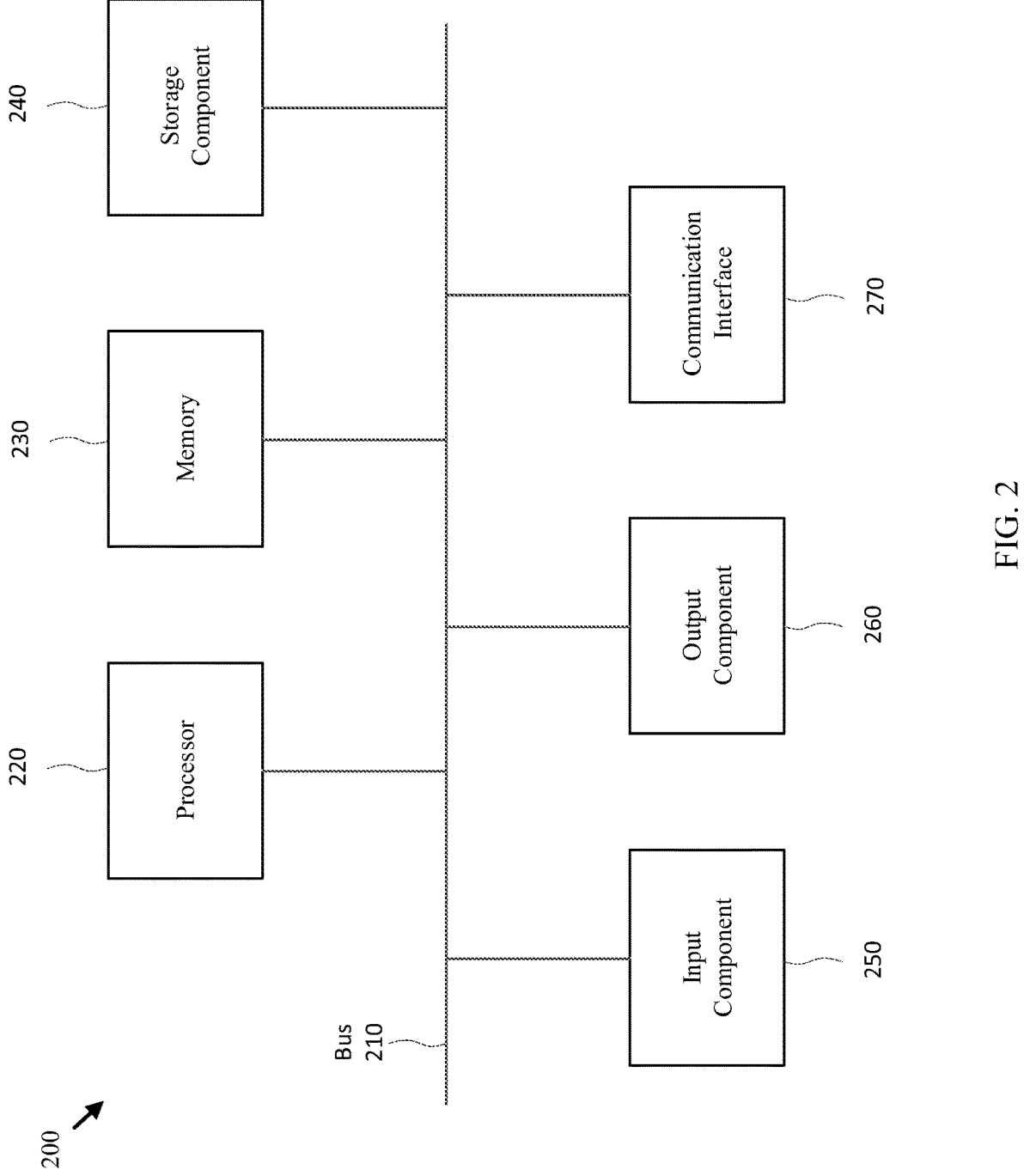
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided as disclosed herein are systems, methods, and devices configured to identify service gaps in a telecommunications network and update service gaps. "Service gap" and "service gap polygon" may be used interchangeably herein and may refer to a polygon generated over a smart network coverage layer, which shows a polygonal area of a poor coverage zone in the network. The systems, methods and devices may generate service gap polygons for each band periodically and provide optimization suggestions to improve the coverage, while further improving the tracking of the service gaps.

When identifying service gaps, the system may utilize various inputs. One input may include a unified coverage layer. A unified coverage layer may be a smart layer generated by superimposing planning prediction data and live test data, and collecting samples from users. An updated band-wise unified coverage layer may be present. Another input may include a site database. The site database may store information for all sites in the network, including information on a latitude, a longitude, an azimuth, band details, on air status, on air date, base station (e.g., eNB) identifier (ID), an evolved universal terrestrial access network (E-UTRAN) cell global identifier (ECGI), antenna height, electrical tilt, mechanical tilt, transmission power, reference signal receive power (RSRP), etc.

Other inputs may include clutter data, which includes information on area morphology (i.e., density of users or accesses), boundaries, which may include radio frequency (RF) cluster and region boundaries, a best server plot, which predicts coverage of a site calculated during a planning phase (e.g., generated from a prediction tool for on air sites), geo-location data, which may be collected using drive test tools such as net velocity, and may be passively collected data that has been used for a predetermined amount of time (e.g., 7 days), cell-wise preventative measurement (PM) counter key performance indicators (KPIs) such as call drop rate, radio resource control (RRC) attempts, RRC re-establishment attempts, mean control quality indicator (CQI), etc.

Figure 3A:
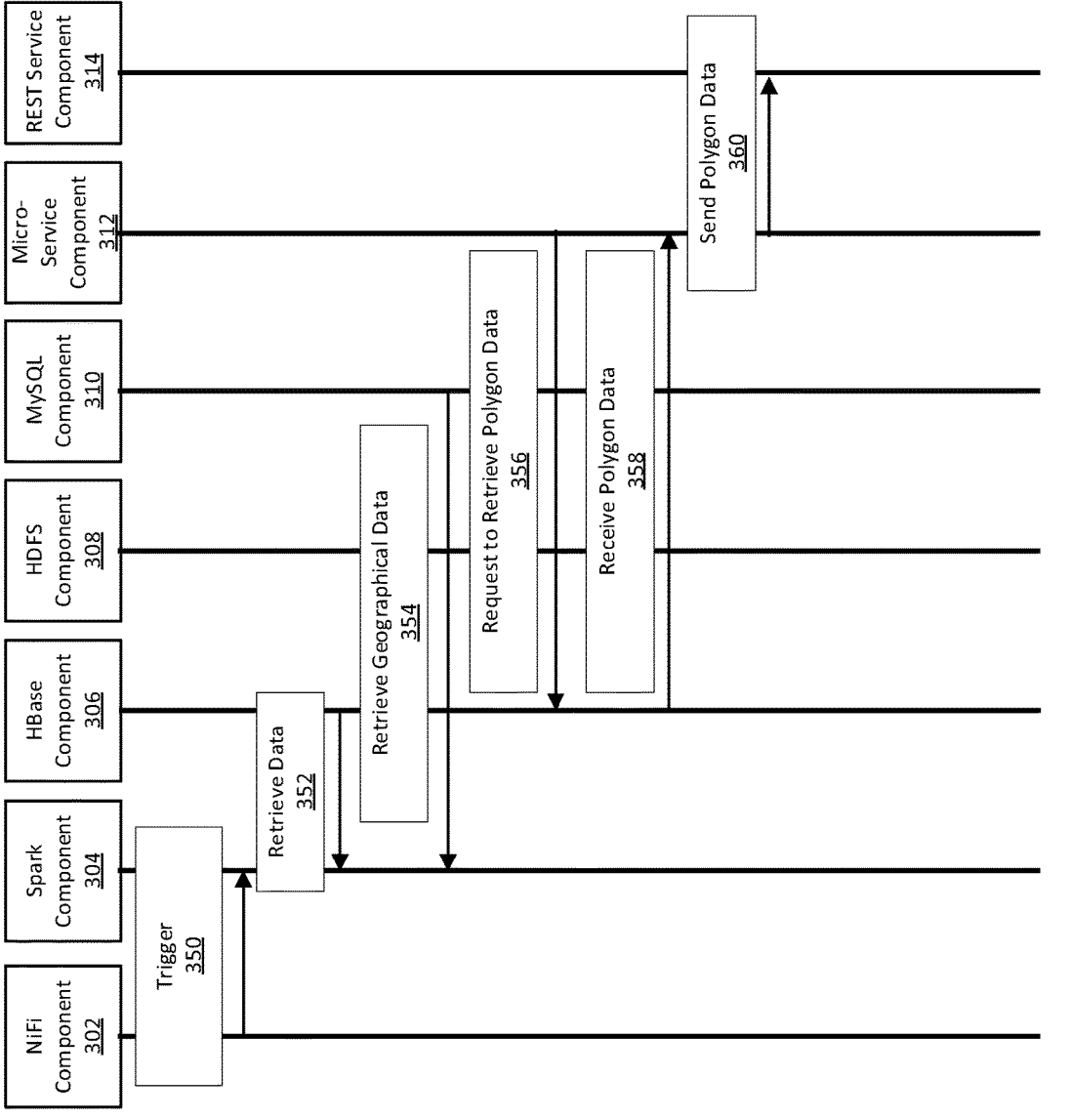
FIGS. 3A and 3B are diagrams of an operation flow of a system for identifying service gaps, according to an example embodiment.
Figure 3B:
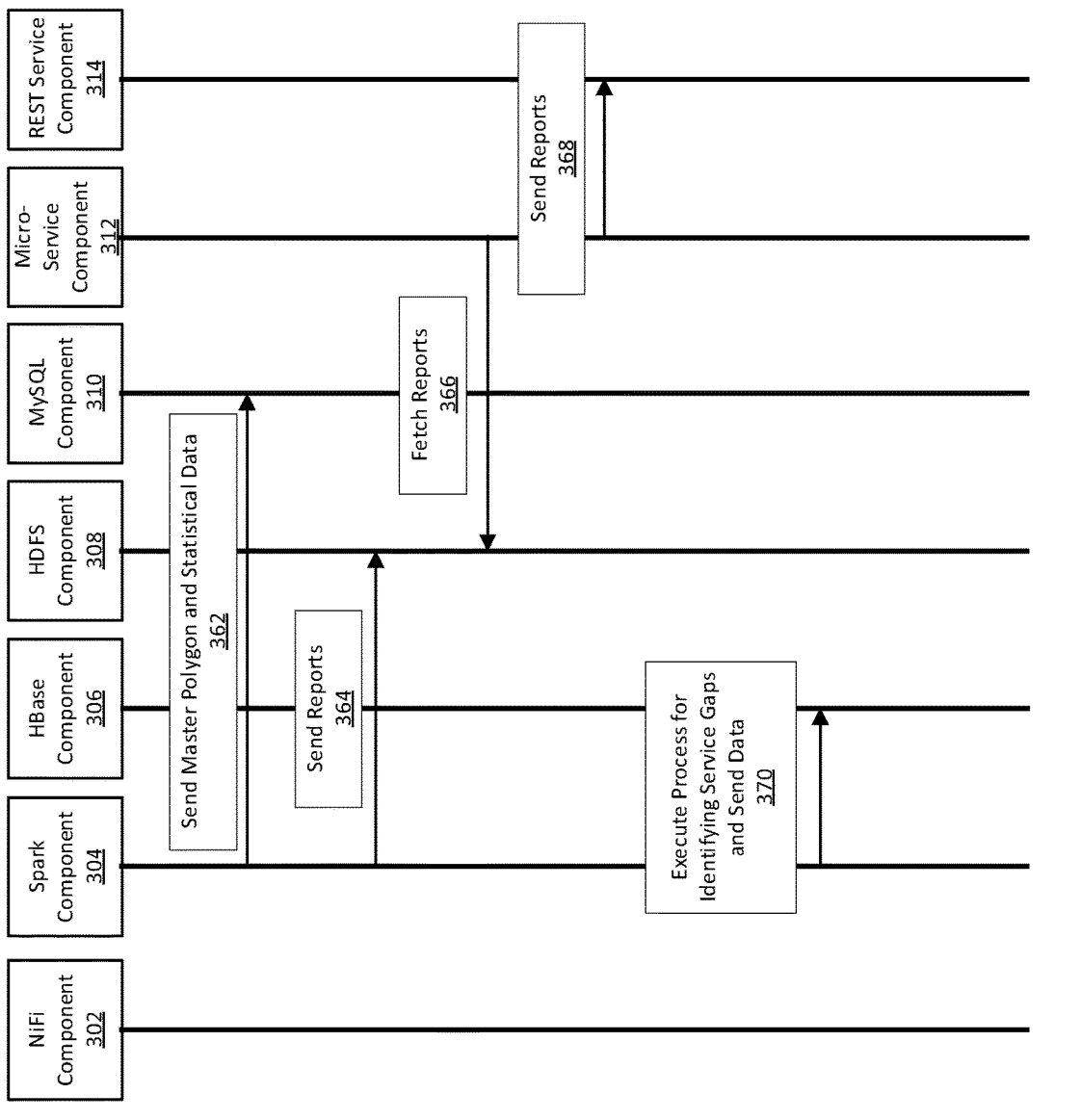

FIGS. 3A and 3B are diagrams of an operation flow of a system for identifying service gaps, according to an example embodiment. The system may include a NiFi component 302, a spark component 304, and HBase component 306, a Hadoop distributed file system (HDFS) component 308, a MySQL component 310, a micro-service component 312, and a representational state transfer (REST) service component 314.

The NiFi component 302 may include a software design that is based on a flow-based programming model and offer features that prominently include the ability to operate within clusters. The NiFi component 302 may be used to ingest streaming data from third-party applications such as Boomer Cell Identification data from various enhanced messaging service (EMS) applications.

The spark component 304 may include a parallel processing framework for running large-scale data analytics applications across clustered computers. The spark component 304 may handle both batch and real-time analytics and data processing workloads.

The HBase component 306 may include a column-oriented non-relational database management system that runs on top of an HDFS. The HBase component 306 may provide a fault-tolerant way of storing sparse data sets.

The HDFS component 308 may be configured for storage of all the raw data that the system uses. All batched data sources may be initially stored into the HDFS component 308 and then processed using the spark component 304. The HBase component 306 may also use the HDFS component 308 for its data storage infrastructure.

The MySQL component 310 may be configured for storage of processed data in the framework. The MySQL component 310 may be utilized for application programming interface (API) retrieval and for serving any real-time user interface (UI) requirements. The aggregated and correlated data may also be stored in the MySQL component 310.

The micro-service component 312 may be configured as an architectural style that structures an application as a collections of services that are highly maintainable and testable. The micro-service component 312 may be loosely coupled, independently deployable, and organized around business capabilities.

In operation 350, the system triggers the spark component 304, with the NiFi component 302 to initiate the process of identifying service gaps. In operation 352, the spark component 304 retrieves data from the HBase component 306, such as the inputs described above. In operation 354, the spark component 304 retrieves geographical and site data from the MySQL component 310. In operation 356, the micro-service component 312 sends a request to the HBase component 306 to retrieve polygon data. In operation 358, the HBase component 306 transmits the requested polygon data to the micro-service component 312. In operation 360, the micro-service component 312 sends the retrieved polygon data to the REST service component 314 for visualization of the polygon data. In operation 362, the spark component 304 sends the master polygon and statistical data generated from the retrieved data (e.g., the inputs) to the MySQL component 310. In operation 364, the spark component 304 sends reports generated based on the retrieved data to the HDFS component 308 for storage. In operation 366, the micro-service component 312 fetches reports from the HDFS component 308. In operation 368, the micro-service component 312 sends the reports to the REST service component 314 for visualization (e.g., generating a map showing the service gaps or overlaying service gaps on an existing map). In operation 370, the spark component 304 executes the process for identifying service gaps (e.g., generating updated service gaps) at a predefined time interval (e.g., daily, weekly, etc.) and sends the data to the HBase component 306.

Figure 4:
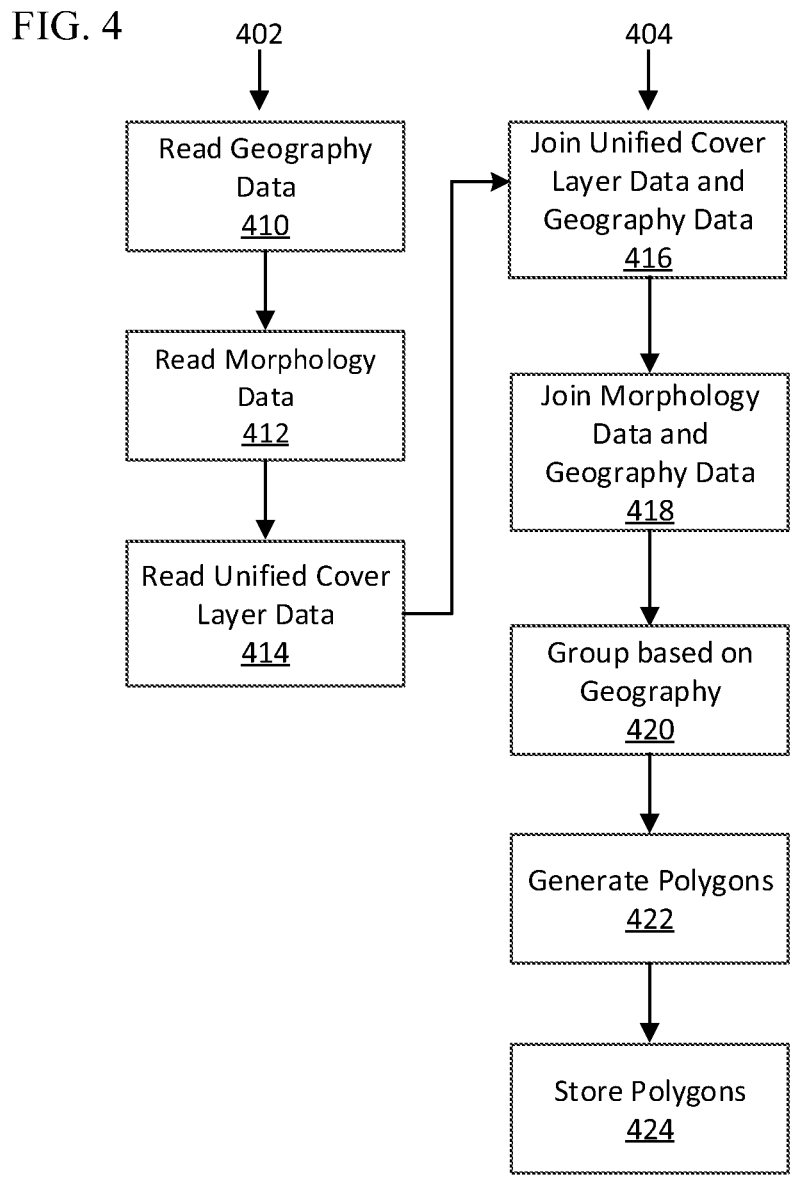
FIG. 4 is a diagram of an overall process of identifying service gaps, according to an example embodiment.

FIG. 4 is a diagram of an overall process of identifying service gaps, according to an example embodiment. The process may include sub-processes such as an input retrieval sub-process 402 and a polygon generation sub-process 404.

In operation 410, the system reads geography data. In operation 412, the system reads morphology data. In operation 414, the system reads unified coverage layer data. In operation 416, the system joins the unified coverage layer data and the geography data. In operation 418, the system joins the morphology data and the geography data. In operation 420, the system performs grouping based on geography. In operation 422, the system generates polygons (e.g., service gaps). In operation 424, the system stores the polygons.

In some embodiments, the system may utilize network cluster boundaries to identify/generate service gaps. The processes may be executed on a per RF cluster basis. The system may not consider the area outside of the RF cluster for the generation of service gaps of the particular RF cluster. The system may prepare tiles based on geography data, unified coverage layer data and clutter data (and/or other inputs as described herein), and then the system may group the tiles based on network cluster boundaries. The unified coverage layer data may include information on numbers of poor samples (i.e., a poor sample being an instance where there was poor coverage in a given area).

The system may divide the unified coverage layer (RSRP) into an array data sets of a predefined resolution (e.g., 75 by 75) for each network cluster. Then, the system determines data sets to be discarded (i.e., removed from consideration for generating the service gap polygons) from the network cluster.

The system may consider various discarding parameters for discarding data sets. For example, the system may discard a data set based on a number of poor coverage samples within the data set being less than a predetermined threshold. Data sets belonging to predefined clutters may also be discarded. The predefined clutters may be clutters associated with limited service availability, such as spare forest areas, forest areas, barren areas, wetland areas, inland water areas, ocean or other water areas, etc. . . . The system may further discard data sets that are in other RF cluster boundaries. For example, if the first, left-most column of the 75×75 network cluster belongs to another network cluster, then the system may discard the first, left-most column from the 75×75 network cluster (alternatively, the system may divide the first, left-most column such that some data sets are included in the network cluster and others are discarded). The system may determine a number of RSRP sample values in each data set based on the uniform coverage layer, and then discard data sets with a number of RSRP samples below a predetermined threshold (e.g., the system may require a data set to have a minimum number of bad samples within the data set for the data set to be considered). The system may discard data sets having a number of poor coverage samples greater than a predetermined threshold (i.e., there may be some areas where the number of poor coverage samples is caused by a known factor and thus the system does not need to consider this area for generating the service gap polygon). Then, the system may connect data sets having poor coverage samples with other, adjacent data sets having poor coverage samples to generate the service gap polygons.

Figure 5:
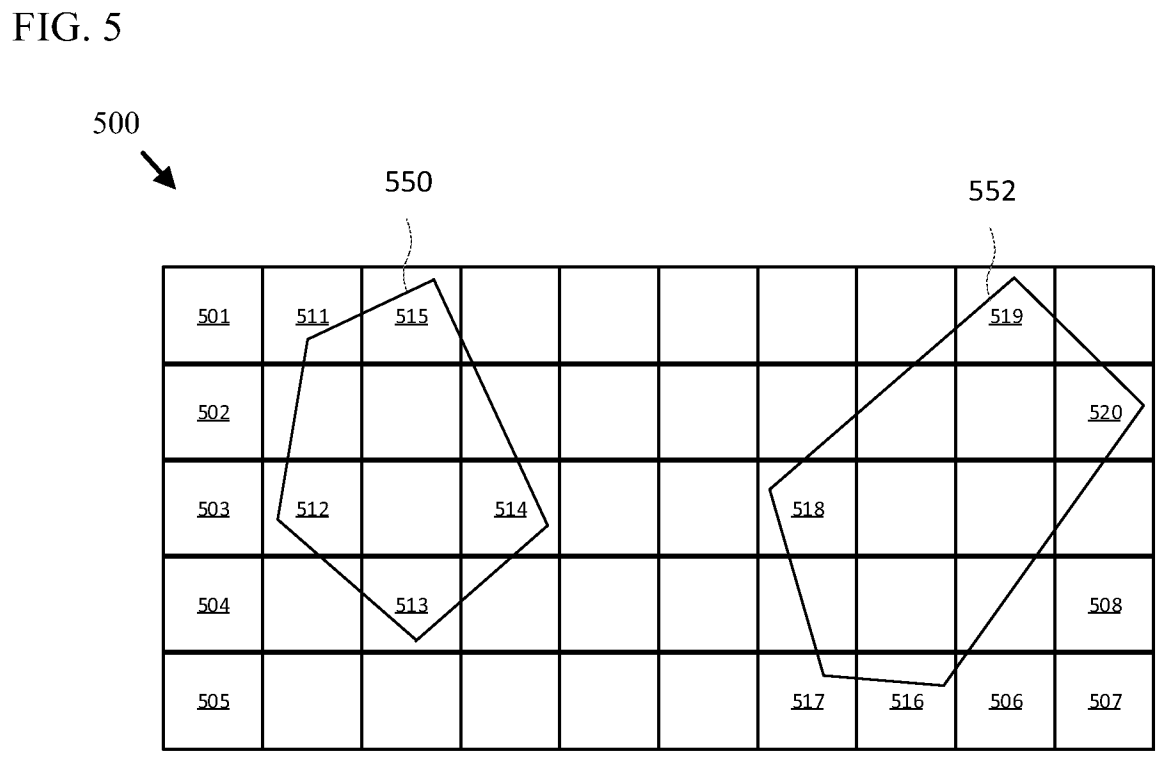

FIG. 5 is a diagram of a network cluster, according to an example embodiment. Although the network cluster 500 is a 5×10 cluster, other clusters sizes may be utilized as will be understood by those of skill in the art from the disclosure herein. In the example shown in FIG. 5, data sets 501-505 are discarded as the system may determine these data sets to be part of another RF network cluster, and data sets 506-508 are discarded as the system may determine that these data-sets do not have a sufficient number of RSRP sample values. Other datasets may be discarded based on the discarding parameters disclosed herein.

The system may determine that data sets 511-515 and data sets 516-520 are not to be discarded and have a sufficient number of poor samples. Thus, the system may connect (e.g., draw a line or boundary) data sets 511-515 to generate a first service gap polygon 550 and connect data sets 516-520 to generate a second service gap polygon 552. In some embodiments, the system may connect all of the data sets 511-520 to generate a single service gap polygon. The system may generate a polygon based on centers of the data sets or various points within the data sets that include a greater number of poor service samples. The system may determine a distance threshold for connecting data sets with a sufficient number of poor samples, and may connect corresponding data sets having a distance that is less than the distance threshold. For example, the system may determine that data set 518 is at a distance from data set 514 that is greater than the distance threshold, such that data set 518 is not included in the first polygon 550.

The system may label the service gap polygons according to the following label nomenclature: RFClusterName_Date-_Band_SequenceNumber. The RFClusterName may correspond to the cluster boundary name that the system is using for ID generation. The Date may correspond to the date of the generation of the unified coverage layer. The Band may correspond to a unique number based on a frequency spectrum. The SequenceNumber may correspond to a unique sequence number for the service gap. For example, if 20 service gap polygons are generated in a network cluster, then a sequence number increasing from 1 to 20 will be assigned to the service gap polygon.

From an initial or predetermined service gap identification/generation process, the service gap polygons from this process may be identified as master polygons. In subsequent service gap identifications (e.g., performed at intervals of predefined time, such as daily, weekly, etc.), if an identified new polygon lies completely within a master polygon, then the new polygon may be assigned the master polygon ID. If multiple polygons lie within the master polygon, then each of the polygons may be provided with the master polygon ID, as well as a subsequent sequence number identifying that the polygons are a child of the master polygon. If a new polygon is identified and intersects with the master polygon, then a sequence number is added to the master polygon ID. The nomenclature may be as: RFClusterName_Date_Band-_SequenceNumber_ChildID.

FIG. 6 is a flowchart of a method of identifying a service gap, according to an embodiment. In operation 602, the system may retrieve data of a geography. In operation 604, the system may retrieve data of a morphology. In operation 606, the system may join unified coverage layer data, geography-wise. In operation 608, the system may divide the unified coverage layer plotted on an L4 geography into data sets (e.g., grids) of, for example, 75 by 75 meters. In operation 610, the system may discard data sets not meeting predefined thresholds based on a number of poor coverage samples (e.g., poor RSRP). In operation 612, the system may discard data sets not meeting a predefined clutter/morphology criteria occupancy requirement For example, the predefined clutter/morphology criteria may include a barren area, a low-vegetation area, a sparse forest area, a sea area, an inland water area, a wetland, etc. . . . In operation 614, the system may connect adjacent data sets based on a number of RSRP poor coverage samples. In operation 616, the system may generate a service gap polygon. In operation 618, the system may store the generated service gap polygons in a database.

FIG. 7 is a flowchart of a method of generating a service gap polygon, according to an example embodiment. In operation 702, the system retrieves data on a network coverage area. In operation 704, the system divides the network coverage area into a plurality of data sets. In operation 706, the system determines a first number of data sets of the plurality of data sets having a first number of poor coverage samples based on the retrieved data. In operation 708, the system generates a service gap polygon based on the determined number of data sets having the first number of poor coverage samples.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for service gap identification, the method comprising:

retrieving data on a network coverage area;

dividing the network coverage area into a plurality of data sets;

determining a first number of data sets of the plurality of data sets having a first number of poor coverage samples based on the retrieved data; and generating a service gap polygon based on the determined number of data sets having the first number of poor coverage samples, wherein the method further comprises determining a second number of data sets of the plurality of data sets to discard, and wherein the second number of data sets are determined as each having a second number of poor coverage samples that is less than a predetermined threshold.

2. The method of claim 1, wherein the retrieved data comprises at least one of geographical data, unified coverage layer data, clutter data, and a numberof reference signal receive power (RSRP) samples.

3. The method of claim 1, wherein the second number of data sets are determined to be discarded based on the second number of data sets belonging to a predefined clutter associated with a limited service availability physical site.

4. The method of claim 1, wherein the second number of data sets are determined to be discarded based on the second number of data sets belonging to another network coverage area.

5. The method of claim 1, wherein generating the service gap polygon comprises connecting, with a line, two data sets, of the first number of data sets, that are determined to be within a predetermined distance threshold of each other.

6. A system for service gap identification, the system comprising:

a memory storing instructions; and a processor configured to execute the instructions to:

retrieve data on a network coverage area;

divide the network coverage area into a plurality of data sets;

determine a first number of data sets of the plurality of data sets having a first number of poor coverage samples based on the retrieved data; and generate a service gap polygon based on the determined number of data sets having the first number of poor coverage samples, wherein the processor is further configured to execute the instructions to determine a second number of data sets of the plurality of data sets to discard, and where in the second number of data sets are determined as each having a second number of poor coverage samples that is less than a predetermined threshold.

7. The system of claim 6, wherein the retrieved data comprises at least one of geographical data, unified coverage layer data, clutter data, and a numberof reference signal receive power (RSRP) samples.

8. The system of claim 6, wherein the second number of data sets are determined to be discarded based on the second number of data sets belonging to a predefined clutter associated with a limited service availability physical site.

9. The system of claim 6, wherein the second number of data sets are determined to be discarded based on the second number of data sets belonging to another network coverage area.

10. The system of claim 6, wherein the processor is configured to execute the instructions to generate the service gap polygon by connecting, with a line, two data sets, of the first number of data sets, that are determined to be within a predetermined distance threshold of each other.

11. A non-transitory computer-readable storage medium storing instructions that, when executed by at least one processor, cause the at least one processor to:

retrieve data on a network coverage area;

divide the network coverage area into a plurality of data sets;

determine a first number of data sets of the plurality of data sets having a first number of poor coverage samples based on the retrieved data; and generate a service gap polygon based on the determined number of data sets having the first number of poor coverage samples, wherein the instructions, when executed, further cause the at least one processor to determine a second number of data sets of the plurality of data sets to discard, and where in the second number of data sets are determined as each having a second number of poor coverage samples that is less than a predetermined threshold.

12. The storage medium of claim 11, wherein the retrieved data comprises at least one of geographical data, unified coverage layer data, clutter data, and a number of reference signal receive power (RSRP) samples.

13. The storage medium of claim 11, wherein the second number of data sets are determined to be discarded based on the second number of data sets belonging to a predefined clutter associated with a limited service availability physical site.

14. The storage medium of claim 11 wherein the second number of data sets are determined to be discarded based on the second number of data sets belonging to another network coverage area.

* * * * *